UNITED STATES PATENT OFFICE.

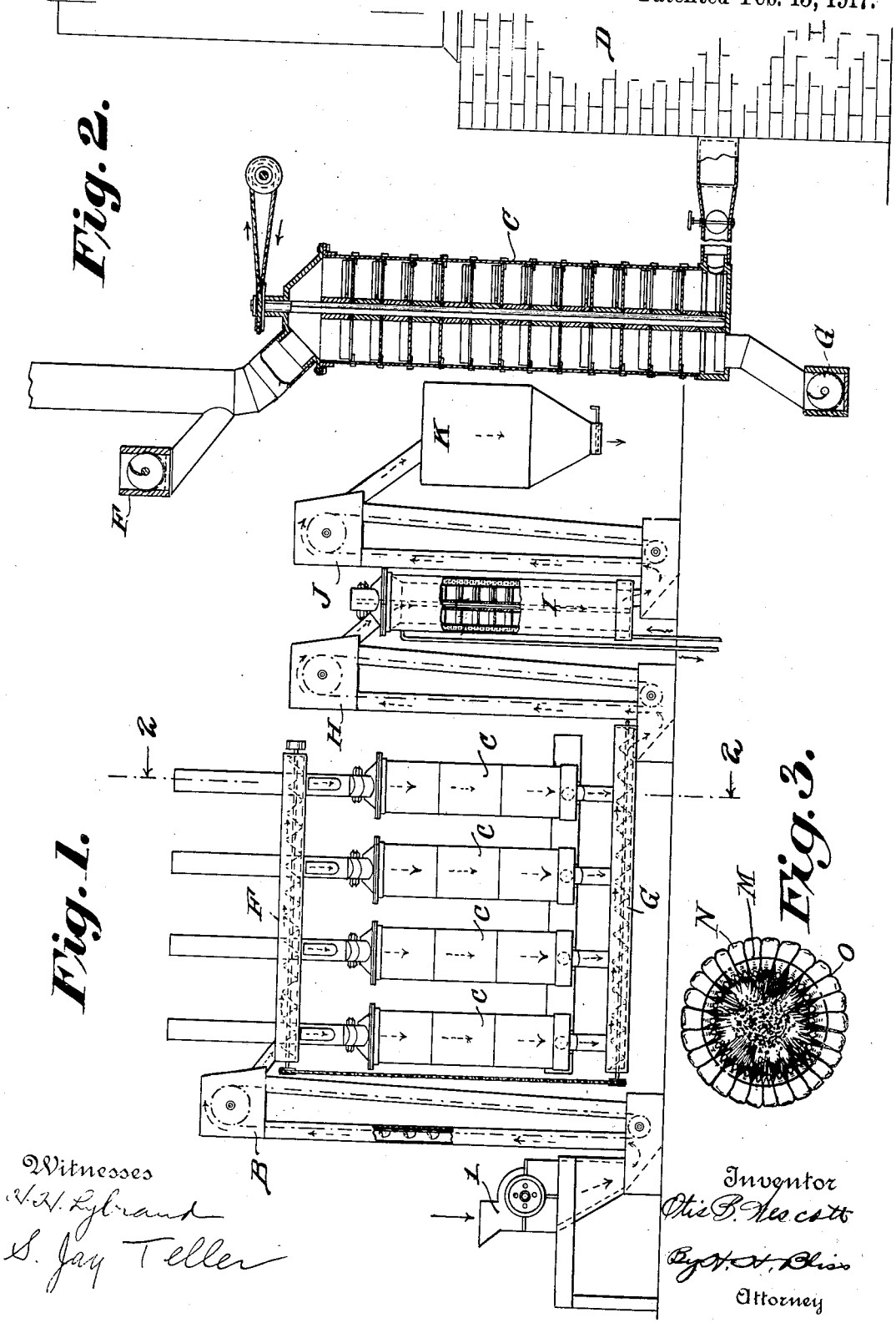

OTIS B. WESCOTT, OF COLUMBUS, OHIO, ASSIGNOR TO THE JEFFREY MANUFACTURING COMPANY, OF COLUMBUS, OHIO, A CORPORATION OF OHIO.

STOCK FOOD AND PROCESS FOR PRODUCING THE SAME.

1,215,597.  Specification of Letters Patent.  Patented Feb. 13, 1917.

Application filed November 5, 1914. Serial No. 870,463.

*To all whom it may concern:*

Be it known that I, OTIS B. WESCOTT, a citizen of the United States, residing at Columbus, in the county of Franklin and State of Ohio, have invented certain new and useful Improvements in Stock Food and Processes for Producing the Same, of which the following is a specification, reference being had therein to the accompanying drawing.

The principal object of the invention is to provide a process for producing stock food from green corn cobs; and another object of the invention is to provide an apparatus by means of which the process can be carried out.

In canneries in which green corn is put up the corn kernels are cut from the green cobs and the cobs themselves are thrown aside as a valueless waste product. I have discovered that these green cobs, carrying as they do parts of the kernels, have a high food value for domestic animals, and by my invention I have provided for the conversion of these green hard cobs into a food suitable for feeding.

In the accompanying drawing I have illustrated conventionally and diagrammatically one form of apparatus which can be used to carry out my process for the conversion of the green corn cobs into stock food.

Of the drawing—

Figure 1 is a side elevation, more or less conventional, of an apparatus by which my process can be carried out; and Fig. 2 is a section taken along the line 2—2 of Fig. 1.

Fig. 3 is a view illustrating, conventionally, a cross section of an ear of corn for the purpose of illustrating some of the present subject-matter.

Referring to the drawings 1 represents a pulverizer of the "swing hammer" type. Into this pulverizer the green corn cobs are fed and they are engaged by the rapidly revolving hammers and reduced to a meal. The pulverizer is arranged to deliver the moist meal pulp to the upward moving conveyer B which is preferably of the endless bucket type.

The meal delivered by the pulverizer and carried upward by the conveyer is of course raw and very moist. In order to dry it and at same time cook it the heaters or driers C, C are provided. D is a furnace adapted to supply hot air to the heaters C, C, the air passing out through stacks E, E and carrying away the moisture from the materials under treatment.

F is a distributing conveyer for receiving the meal from the conveyer B and carrying it to the several receivers. Preferably a screw conveyer is used.

The meal, during its passage through the heaters and driers C, C is entirely freed of moisture and is partially cooked.

The temperature of the air in the driers is regulated or controlled as closely as possible to attain the necessary results which are, first, the driving off of the moisture, second, the cooking, or partial cooking, of the materials, this being carried so far as to effect a sterilizing and a partial carbonizing or caramelizing of the starches, sugars or proteins, thereby adding materially to the palatability of the product.

From the heaters and driers C, C the meal passes to the conveyer G which carries it to the elevating conveyer H. From the conveyer H it is discharged into the cooler I. The purpose of this cooler I is to reduce the temperature of the meal to such a point that sweating will be avoided in the storage bins or in the packages in which the meal may be placed for shipment and distribution.

The reduction of the temperature is effected as soon as possible in the coolers by currents of air; this preventing the retention of heat in the interior which may result in incipient fermentation, and also overcomes the tendency of the fatty or oily bodies to break up or become rancid, which occurs at a high temperature in the presence of oxygen.

From the cooler I the meal is carried by the conveyer J to the receiver K from which it can be released to be put in bags or other containers.

From the foregoing description it will be understood that the process consists in the introduction of the corn cobs into the pulverizer to be ground; in the transferring of the ground cobs to the heaters and driers in which the moisture is removed and in which the meal is cooked to a greater or less extent as may be desired; and in transferring the meal to the cooler in which the meal is reduced to a suitable temperature.

It will be seen that by my invention I have provided a method and an apparatus whereby the heretofore valueless and useless green cobs can be treated and converted into a food which has high nutritive value and which is in suitable form for feeding.

It is to be noted that my invention is primarily adapted for the treatment of the cobs of green sweet corn. When the kernels are cut from the cobs in the canneries there necessarily remains attached to the cobs the tip ends of the kernels, probably averaging at least ten per cent. by weight of the entire kernels. These tip ends of the kernels are high in food value, especially in sugar, in the case of sweet corn, which is the kind intended to be used. And the cobs themselves being green still contain a large amount of the corn milk which of itself has a high food value.

The kernels are cut from the cob at the planes referred to, not only because of the fact that the kernel tips are surrounded by the cob husks up to those planes, and that it is not desirable to have the husk parts taken off with the kernels to go into the cans, but also because of the fact that the tips are more heavily charged (than are the outer portions of the kernels) with the vegetable oils or fatty matters which are digestible with difficulty in the human stomach, and also with proteins of the less digestible sort. A period for peptonizing is required for the digestion of these oil-charged tip portions of the corn kernels longer than the period which is available while traveling through the digestive canal of the human body. But they are more readily digestible by the animals to whom the food material herein contemplated is fed.

Of course, there can be variations in respect to the lengths of these tip portions up to the planes of cutting; but my own investigations have disclosed that, on the average, the tip, or inner portion of the kernel, should be about forty per cent. of the total length.

In Fig. 3 I have conventionally illustrated a section of a cob. The points at which the cutting of the kernels is effected are approximately indicated by the circular line M, the cob at N, and the parts adhering thereto, indicated by O, being those which I subject to the treatment herein described.

The cobs of green sweet corn are to be distinguished from the cobs of ripe field corn from which the kernels have been removed by shelling. In the case of those cobs there is not sufficient food value to adapt them to be prepared for use as feed. All parts of the kernel have, of course, been entirely removed and the cobs themselves are dry and woody.

What I claim is:

1. The hereindescribed process of producing stock food which consists in grinding while green and moist the corn cobs from which the green kernels have been cut, and heating the meal resulting from the said grinding and thereby drying and cooking it.

2. The hereindescribed process of producing stock food which consists in grinding while green and moist the corn cobs from which the green kernels have been cut, heating the meal resulting from the said grinding and thereby drying and cooking it, and cooling the meal immediately after the said drying, heating and cooking.

3. A process for the production of stock food consisting in comminuting fresh green cobs, drying the resulting meal at a high temperature, and cooling the product preparatory to packing.

4. A process for the production of stock food consisting in the comminution, while fresh and green and containing all of the natural juices, of the cobs from which the kernels of green corn have been cut, drying the resulting meal at a temperature sufficiently high to convert the sugars into caramel, and immediately cooling the product preparatory to packing.

5. A process for the production of stock food, consisting in the comminution of fresh green corn cobs from which the green kernels have been cut, drying the resulting meal at a temperature sufficiently high to convert the sugars into caramel, and cooling the product preparatory to packing.

6. The herein-described process, consisting in cutting from the cob the outer parts of the kernels while the cobs and the kernels are more or less charged with saps and juices susceptible of fermentation, then forming a dried and non-fermentable mass composed of the finely reduced particles of the cobs and the inner end parts or tips of the kernels, together with the starchy, sugary and protein bodies in said cobs and tips.

7. The herein-described product obtained from corn ears while charged with sappy fluids containing starchy, sugary and protein bodies, consisting of a more or less cooked, dried and sterilized mass of relatively fine particles composed of the particles of the cobs and the particles of the inner end portions of the kernels that normally lie inside of the outer ends of the cob husks.

In testimony whereof, I affix my signature, in presence of two witnesses.

OTIS B. WESCOTT.

Witnesses:
DUDLEY T. FISHER,
E. V. FRANCIS.